United States Patent
Lee et al.

(10) Patent No.: US 11,433,380 B2
(45) Date of Patent: Sep. 6, 2022

(54) CATALYST FOR REDUCING CARBON MONOXIDE AND HYDROCARBON, AND METHOD FOR PREPARING THE SAME

(71) Applicants: HYUNDAI MOTOR COMPANY, Seoul (KR); KIA CORPORATION, Seoul (KR); KOREA UNIVERSITY RESEARCH AND BUSINESS FOUNDATION, Seoul (KR)

(72) Inventors: Kwan-Young Lee, Seoul (KR); Dalyoung Yoon, Seongnam-si (KR); Jin Woo Choung, Suwon-si (KR); Jungkyu Choi, Seoul (KR); Eun Jun Lee, Seoul (KR); Yaeun Seo, Seoul (KR); Haney Park, Seoul (KR)

(73) Assignees: HYUNDAI MOTOR COMPANY, Seoul (KR); KIA CORPORATION, Seoul (KR); KOREA UNIVERSITY RESEARCH AND BUSINESS FOUNDATION, Seoul (KR)

(*) Notice: Subject to any disclaimer, the term of this patent is extended or adjusted under 35 U.S.C. 154(b) by 0 days.

(21) Appl. No.: 17/356,812

(22) Filed: Jun. 24, 2021

(65) Prior Publication Data
US 2022/0152601 A1    May 19, 2022

(30) Foreign Application Priority Data
Nov. 19, 2020  (KR) ........................ 10-2020-0155740

(51) Int. Cl.
| | |
|---|---|
| *B01J 31/02* | (2006.01) |
| *B01J 23/42* | (2006.01) |
| *B01J 21/06* | (2006.01) |
| *B01J 37/04* | (2006.01) |
| *B01J 37/00* | (2006.01) |
| *B01J 37/06* | (2006.01) |
| *B01J 37/08* | (2006.01) |
| *B01J 37/02* | (2006.01) |
| *B01J 35/00* | (2006.01) |
| *B01J 35/02* | (2006.01) |
| *B01D 53/94* | (2006.01) |

(52) U.S. Cl.
CPC ........ *B01J 31/0238* (2013.01); *B01D 53/944* (2013.01); *B01J 21/066* (2013.01); *B01J 23/42* (2013.01); *B01J 35/0006* (2013.01); *B01J 35/023* (2013.01); *B01J 37/009* (2013.01); *B01J 37/0217* (2013.01); *B01J 37/04* (2013.01); *B01J 37/06* (2013.01); *B01J 37/082* (2013.01); *B01D 2255/1021* (2013.01); *B01D 2255/20715* (2013.01); *B01D 2255/30* (2013.01); *B01D 2255/40* (2013.01); *B01D 2255/9022* (2013.01); *B01D 2255/9202* (2013.01)

(58) Field of Classification Search
CPC ... B01J 31/02; B01J 23/42; B01J 21/06; B01J 37/04; B01J 37/00; B01J 37/06; B01J 37/08; B01J 37/02; B01J 35/00; B01J 35/02; B01J 31/0238; B01J 35/0006; B01J 37/0217; B01J 21/066; B01J 37/009; B01J 37/082; B01J 35/023; B01D 53/94; B01D 53/944; B01D 2255/20715; B01D 2255/1021; B01D 2255/30; B01D 2255/40; B01D 2255/9022; B01D 2255/9202
See application file for complete search history.

(56) References Cited

FOREIGN PATENT DOCUMENTS

WO   WO 2018 097 550 A2 *   5/2018   ............. B01J 23/42

OTHER PUBLICATIONS

Lee, Eun-Jun, et al., "Development of Etched SiO2@Pt@ZrO2 Core-Shell Structure Catalyst for CO and C3H6 Oxidation at Low Temperature," KIChE Fall Meeting and International Symposium, Oct. 16, 2020.

* cited by examiner

*Primary Examiner* — Timothy C Vanoy
(74) *Attorney, Agent, or Firm* — McDonnell Boehnen Hulbert & Berghoff LLP

(57) ABSTRACT

The present disclosure provides a catalyst for reducing CO and HC which is a core-shell particle including a core and a shell surrounding the core, the core includes metal oxide nanoparticles and noble metal nanoparticles fixed to the metal oxide nanoparticles, and the shell includes zirconia ($ZrO_2$), and a layer from which the metal oxide is removed between the core and the shell is included.

14 Claims, 8 Drawing Sheets

CATALYST FOR REDUCING CARBON MONOXIDE AND HYDROCARBON, AND METHOD FOR PREPARING THE SAME

CROSS REFERENCE TO RELATED APPLICATIONS

This application claims priority to and the benefit of Korean Patent Application No. 10-2020-0155740 filed in the Korean Intellectual Property Office on Nov. 19, 2020, the entire contents of which are incorporated herein by reference.

BACKGROUND (a) Field

The present disclosure relates to a catalyst for reducing CO and HC with improved low temperature oxidation performance of CO and HC and heat resistance, and a method for preparing the same.

(b) Description of the Related Art

An exhaust gas of a gasoline vehicle is purified by a three-way catalyst, and when the temperature of the catalyst is greater than or equal to 400° C., a purification performance of nearly 100% may be obtained. However, in the cold-start section immediately after engine start, the three-way catalyst does not operate normally, so the exhaust gas cannot be purified and is discharged into the atmosphere. In particular, it is known that about 70% is emitted from the cold start section of hydrocarbon (HC).

In addition, since the catalyst is obviously deactivated by exposure to the exhaust gas at a high temperature while driving a vehicle, heat resistance of the catalyst needs to be improved.

On the other hand, as for a catalyst with a core-shell structure, a metal forming the core may be suppressed from sintering through the shell, but the shell may block diffusion of reaction materials and thus deteriorate performance of the catalyst.

SUMMARY

An object of the present disclosure is to provide a catalyst for reducing CO and HC with improved catalytic performance wherein the catalyst improves low temperature oxidation performance and heat resistance of CO and HC, even after hydrothermal treatment, sintering of noble metals is suppressed, and diffusion of CO and HC is facilitated.

Another object of the present disclosure is to provide a method for preparing the catalyst for reducing CO and HC.

According to an embodiment of the present disclosure, a method for preparing a catalyst for reducing CO and HC includes fixing noble metal nanoparticles to the metal oxide nanoparticles to form a core; forming a shell by coating the core with zirconia ($ZrO_2$); and etching the metal oxide of the prepared core-shell particles.

The forming of the core may include functionalizing the surface of the metal oxide nanoparticles with an amine group, and fixing the noble metal nanoparticles to the metal oxide nanoparticles functionalized with the amine group.

The forming of the shell may include dispersing the core in a solvent to prepare dispersion, adding a zirconia precursor to the dispersion followed by mixing and drying, and firing the resultant at about 300° C. to about 800° C. for about 1 hour to about 24 hours.

The etching of the metal oxide may include dispersing the core-shell particles in a solvent to prepare dispersion, and adding KOH or HF to the dispersion.

A concentration of the KOH or HF may be about 0.1 M to about 10.0 M.

The etching of the metal oxide may include removing the metal oxide nanoparticles from the surface of the metal oxide nanoparticles to a predetermined depth to form a layer from which the metal oxide is removed between the core and the shell.

According to another embodiment of the present disclosure, a catalyst for reducing CO and HC which is a core-shell particle includes a core and a shell surrounding the core, wherein the core includes metal oxide nanoparticles and noble metal nanoparticles fixed to the metal oxide nanoparticles, and the shell includes zirconia ($ZrO_2$), and a layer from which the metal oxide is removed between the core and the shell is included.

The noble metal nanoparticles may include Pd, Pt, Ru, Au, or an alloy thereof.

The noble metal nanoparticles may be included in an amount of about 0.1 wt % to about 3 wt % based on a total weight of the catalyst.

The noble metal nanoparticles may have a size of about 1 nm to about 30 nm.

The metal oxide nanoparticle may include $SiO_2$, $TiO_2$, $Al_2O_3$, or a mixture thereof.

The shell may have a thickness of about 5 nm to about 50 nm.

The layer from which the metal oxide is removed may have a thickness of about 10 nm to about 70 nm.

The HC may include $CH_4$, $C_2H_6$, $C_3H_6$, $C_3H_8$, or a mixture thereof.

The catalyst for reducing CO and HC of the present disclosure improves the low temperature oxidation performance of CO and HC and heat resistance, suppresses sintering of noble metals even after hydrothermal treatment, and facilitates diffusion of CO and HC, thereby improving catalytic performance.

DETAILED DESCRIPTION

Figure 1:
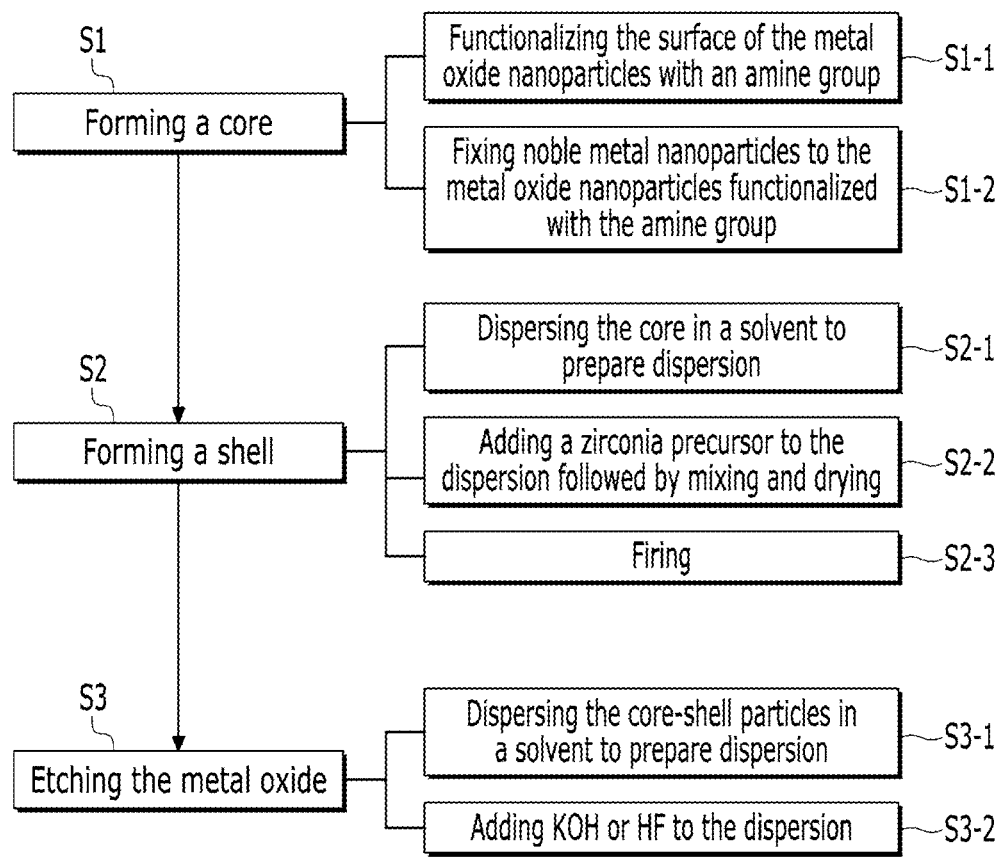
FIG. 1 is a process flow chart showing a method of preparing a catalyst for reducing CO and HC according to an embodiment.

The advantages and features of the present disclosure and the methods for accomplishing the same will be apparent from the embodiments described hereinafter with reference to the accompanying drawings. However, an implemented form may not be limited to example embodiments disclosed below. Unless otherwise defined, all terms (including technical and scientific terms) used herein have the same meaning as commonly understood by one of ordinary skill in the art. In addition, terms defined in a commonly used dictionary are not to be ideally or excessively interpreted unless explicitly defined.

In addition, unless explicitly described to the contrary, the word "comprise", and variations such as "comprises" or "comprising," will be understood to imply the inclusion of stated elements but not the exclusion of any other elements.

Further, the singular includes the plural unless mentioned otherwise.

The catalyst for reducing CO and HC according to an embodiment of the present disclosure is a core-shell particle including a core and a shell surrounding the core, wherein the layer from which the metal oxide is removed between the core and the shell is included.

The core includes metal oxide nanoparticles and noble metal nanoparticles fixed to the metal oxide nanoparticles.

The metal oxide nanoparticles may include $SiO_2$, $TiO_2$, $Al_2O_3$, or a mixture thereof.

The metal oxide nanoparticles may have a size of about 100 nm to about 1000 nm. When the size of the metal oxide nanoparticles is less than about 100 nm, the noble metal nanoparticles may not be evenly dispersed, and when the size of the metal oxide nanoparticles exceeds about 1000 nm, catalytic activity points may decrease and thus activity may decrease.

The noble metal nanoparticles may include Pd, Pt, Ru, Au, or an alloy thereof.

The noble metal nanoparticles may have a size of about 1 nm to about 30 nm. When the size of the noble metal nanoparticles is less than about 1 nm, the activity may decrease, and when it exceeds about 30 nm, the activity may decrease due to the sintering phenomenon.

The noble metal nanoparticles may be included in an amount of about 0.1 wt % to about 3 wt % based on a total weight of the catalyst. When the content of the noble metal nanoparticles is less than about 0.1 wt %, the catalytic activity points may decrease and the activity may decrease, and when it exceeds about 3 wt %, the activity may decrease due to sintering.

The catalyst includes a layer from which the metal oxide is removed between the core and the shell. The layer from which the metal oxide is removed may be formed by etching the metal oxide nanoparticles from the surface to a predetermined depth in a method of preparing the catalyst, which will be described later.

The layer from which the metal oxide is removed may be a hollow space. However, when the metal oxide is not completely removed, some of the metal oxide or the noble metal nanoparticles may be included therein, or the sintered noble metal nanoparticles may be included therein as the metal oxide is etched. Herein, the metal oxide not removed yet may be less than or equal to about 10 volume % based on the total volume of the layer from which the metal oxide is removed.

The layer from which the metal oxide is removed may have a thickness of about 10 nm to about 70 nm. When the layer from which the metal oxide is removed has a thickness of less than about 10 nm, the gas diffusion through the catalytic activity points may be limited, and when the thickness is greater than about 70 nm, the noble metal nanoparticles may be sintered. Herein, the thickness of the layer from which the metal oxide is removed may be an average distance from the internal surface of the shell to the surface of the metal oxide nanoparticle, and the average distance may be measured from a transmission electron microscope (TEM) image of the catalyst.

The shell includes zirconia ($ZrO_2$).

The shell may have a thickness of about 5 nm to about 50 nm. When the shell has a thickness of less than about 5 nm, the heat resistance may be weak, and when the thickness is greater than about 50 nm, the gas diffusion may be limited.

In a conventional catalyst with a core-shell structure, sintering of a noble metal forming the core may be suppressed through the shell when exposed to high temperatures, but the shell blocks diffusion of reaction materials, there may be a problem of deteriorating performance. On the other hand, the catalyst according to an embodiment has easily diffuses the reaction materials through the layer from which the metal oxide is removed and thus is suppressed from the performance deterioration and has easy accessibility to CO and HC and thus exhibits excellent low temperature oxidation performance, compared with the conventional catalyst.

A method for preparing a catalyst for reducing CO and HC according to another embodiment of the present disclosure includes fixing noble metal nanoparticles to the metal oxide nanoparticles to form a core, forming a shell by coating the core with zirconia ($ZrO_2$), and etching the metal oxide of the prepared core-shell particles.

FIG. 1 is a process flow chart showing a method of preparing a catalyst for reducing CO and HC according to an embodiment. Hereinafter, a method of preparing a catalyst for reducing CO and HC is described in detail with reference to FIG. 1.

First, the noble metal nanoparticles are fixed to the metal oxide nanoparticles to form the core at S1.

Since the descriptions of the noble metal nanoparticles and the metal oxide nanoparticles are the same as described above, repetitive descriptions will be omitted.

For example, the forming of the core at S1 may include functionalizing the surface of the metal oxide nanoparticles with an amine group at S1-1, and fixing the noble metal nanoparticles to the metal oxide nanoparticles functionalized with the amine group at S1-2.

For example, the functionalizing of the surface of the metal oxide nanoparticles with an amine group at S1-1 may be performed by adding an amino silane-based compound to the dispersion in which metal oxide nanoparticles are dispersed.

The amino silane-based compound may be, for example, aminopropyltrimethoxysilane, aminopropyltriethoxysilane, aminopropylmethyldimethoxysilane, aminopropyldimethylmethoxysilane, N-methylaminopropyltrimethoxysilane, N,N-dimethylaminopropyltrimethoxysilane, N-methylaminopropyltrimethoxysilane, N-methylaminopropyltriethoxysilane, N,N-dimethylpropyltriethoxysilane, piperidinopropyltrimethoxysilane, imidazolinopropyltrimethoxysilane, aminoethylaminopropyltrimethoxysilane, pyrrolidinopropyltrimethoxysilane, piperazinopropyltrimethoxysilane, morpholinopropyltrimethoxysilane, pyrazolinopropyltrimethoxysilane, trizaolinopropyltrimethoxysilane, or benzylidene propylaminotrimethoxysilane.

The fixing of the noble metal nanoparticles to the metal oxide nanoparticles functionalized with the amine group at S1-2 may include adding the noble metal nanoparticles to dispersion in which the metal oxide nanoparticles are dispersed followed by mixing and drying, and firing the resultant, and firing the resultant.

The solvent for dispersing the metal oxide nanoparticles may include methanol, ethanol, isopropanol, water, butanol, or a combination thereof.

The drying may be performed at about 20° C. to about 80° C. for about 24 hours to about 60 hours.

The firing may be performed at about 300° C. to about 800° C. for about 1 hour to about 24 hours. When the firing temperature is less than about 300° C. or the firing time is less than 1 hour, the polymer such as polyvinylpyrrolidone used in the preparation of the noble metal nanoparticles may not be sufficiently removed, while when the firing temperature exceeds about 800° C. or the firing time exceeds 24 hours, the formed noble metal nanoparticles may be sintered.

The forming of the shell at S2 may include dispersing the core in a solvent to prepare dispersion at S2-1, adding a zirconia precursor to the dispersion followed by mixing and drying at S2-2, and firing the resultant at S2-3.

The solvent for dispersing the core may include methanol, ethanol, isopropanol, distilled water, lutensol, ethanol, or a combination thereof. For example, lutensol, distilled water, or ethanol and distilled water may be additionally added to the dispersion in which the core is dispersed.

The zirconia precursor may include zirconium butoxide, zirconium ethoxide, or a combination thereof.

The drying may be performed at about 20° C. to about 80° C. for about 24 hours to about 60 hours.

The firing may be performed at about 300° C. to about 800° C. for about 1 hour to about 24 hours. When the firing temperature is less than about 300 C or the firing time is less than 1 hour, a zirconia shell structure may not be sufficiently formed, while when the firing temperature exceeds about 800° C. or the firing time exceeds about 24 hours, the formed shell structure may collapse.

The etching of the metal oxide of the core-shell particle at S3 may include dispersing the core-shell particles in a solvent to prepare dispersion at S3-1, and adding KOH or HF to the dispersion followed by mixing and drying the resultant at S3-2.

The solvent for dispersing the core-shell particle may include methanol, ethanol, isopropanol, distilled water, or a combination thereof.

A concentration of the KOH or HF may be greater than or equal to about 0.1 M, for example greater than or equal to about 0.2 M, greater than or equal to about 0.3 M, or greater than or equal to about 0.4 M, and less than or equal to about 10.0 M, for example less than or equal to about 6.4 M, less than or equal to about 3.2 M, or less than or equal to about 1.6 M, or about 0.1 M to about 10.0 M, for example about 0.2 M to about 6.4 M, about 0.3 M to about 3.2 M, or about 0.4 M to about 1.6 M.

When the concentration of KOH or HF is less than about 0.1 M, the etching may not sufficiently occur, but when the concentration is greater than about 10.0 M, the nanoparticles may collapse due to excessive etching.

The drying may be performed at about 20° C. to about 80° C. for about 24 hours to about 60 hours.

Hereinafter, specific examples of the disclosure are described. However, the examples described below are for illustrative purposes only, and the scope of the disclosure is not limited thereto.

PREPARATION EXAMPLE: PREPARATION OF CORE-SHELL CATALYST

Example 1

1) Preparation of Noble Metal Nanoparticles (Preparation of Pt Nanoparticles)

0.4268 g of polyvinylpyrrolidone (PVP) was dissolved in 8 mL of ethylene glycol and then, stirred, while preheated at 160° C.

Subsequently, a solution prepared by dissolving 0.04255 g of potassium tetrachloroplatinate ($K_2PtCl_4$) in 2 ml of ethylene glycol was added to the mixture.

When a reaction was complete, the reaction solution was mixed with acetone and then, centrifuged (10000 rpm, 5 min) to recover nanoparticles produced therein.

2) Fixation of Noble Metal Nanoparticles to Core 2-1) Preparation of Amine Group-Treated Silica ($SiO_2$)

74 ml of ethanol was mixed with 10 ml of distilled water and 3.15 ml of ammonia, and then, 6 ml of a silica precursor (tetraethyl orthosilicate, $Si(OC_2H_5)_4$) was added thereto and then, stirred for 12 hours and centrifuged (10000 rpm, 5 min) to recover nanoparticles.

The produced silica was washed with ethanol and propanol and then, dispersed in 320 ml of propanol.

Subsequently, 3-aminopropyltriethoxysilane (ATPS) was added to the dispersed solution to treat an amine group on the silica surface.

After 30 minutes, the mixture was stirred at 80° C. for 2 hours and centrifuged (10000 rpm, 5 minutes) to recover amine group-treated silica, and the amine group-treated silica is dispersed in ethanol.

2-2) Preparation of Pt Nanoparticles ($SiO_2$@Pt) Fixed to Silica ($SiO_2$)

300 ml of the prepared silica ($SiO_2$) dispersion was mixed with 20 ml of the prepared Pt nanoparticle dispersion and then, stirred for 12 hours.

Subsequently, the obtained mixture was centrifuged to recover nanoparticles, and the nanoparticles were dried at 60° C. and fired at 500° C. for 10 hours to prepare Pt nanoparticles ($SiO_2$@Pt) fixed to silica.

3) Coating Core with Zirconia Shell ($SiO_2$@Pt@$ZrO_2$)

0.4 g of the prepared $SiO_2$@Pt was dispersed in 40 mL of ethanol with high purity and then, maintained at 30° C.

Subsequently, 210 μL of lutensol and 90 μL of distilled water were added to the solution and then, stirred and mixed for 1 hour.

1.1 mL of zirconium butoxide was added to the mixture and then, stirred for 12 hours.

The mixed solution was centrifuged to recover particles, and the particles were four times washed with distilled water.

The produced particles were dispersed in 200 mL of distilled water and then, maintained for 72 hours and recovered with a centrifuge (10000 rpm, 5 min).

The obtained particles were dried at 60° C. and fired at 500° C. for 10 hours to obtain $SiO_2$@Pt@$ZrO_2$.

4) Etching Treatment of Core-shell Catalyst 0.5 g of the obtained $SiO_2$@Pt@$ZrO_2$ was dispersed in 100 mL of distilled water at room temperature.

KOH at a concentration of 6.4 M was added to the sufficiently-dispersed solution, so that a concentration of the mixture reached 0.1 M, and then, stirred for 3 hours.

Nanoparticles produced therein were recovered with a centrifuge (2500 rpm, 8 min) and then, five times washed with distilled water.

The obtained nanoparticles were dried at 60° C. and etched to obtain $SiO_2$@Pt@$ZrO_2$. Herein, when a Pt content in the obtained catalyst was measured with ICP, the result was 0.32 wt %.

Example 2

Etched $SiO_2$@Pt@$ZrO_2$ was obtained according to the same method as Example 1 except that KOH at a concentration of 6.4 M was added so that the concentration of the mixture was 0.2 M, and then etched.

Example 3

Etched $SiO_2$@Pt@$ZrO_2$ was obtained according to the same method as Example 1 except that KOH at a concentration of 6.4 M was added so that the concentration of the mixture was 0.4 M, and then etched.

Example 4

Etched $SiO_2$@Pt@$ZrO_2$ was obtained according to the same method as Example 1 except that KOH at a concentration of 6.4 M was added so that the concentration of the mixture was 1.6 M, and then etched.

Example 5

Etched $SiO_2$@Pt@$ZrO_2$ was obtained according to the same method as Example 1 except that KOH at a concentration of 6.4 M was added so that the concentration of the mixture was 3.2 M, and then etched.

Comparative Example 1

Etched $SiO_2$@Pt@$ZrO_2$ was obtained according to the same method as Example 1 except that the core-shell catalyst was not etched.

Experimental Example 1: TEM Image of $SiO_2$@Pt@$ZrO_2$ Catalyst According to Etching Conditions The $SiO_2$@Pt@$ZrO_2$ catalysts according to Examples 1 to 5 and Comparative Example 1 were examined with a transmission electron microscope (TEM), and the results are shown in FIG. 2.

Figure 2A:
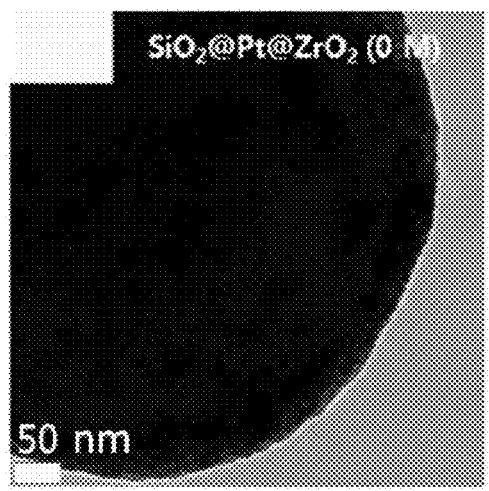
FIGS. 2A, 2B, 2C, 2D, 2E, and 2F are photographs showing the result of observing the catalyst with a transmission electron microscope (TEM) in Experimental Example 1.
Figure 2B:
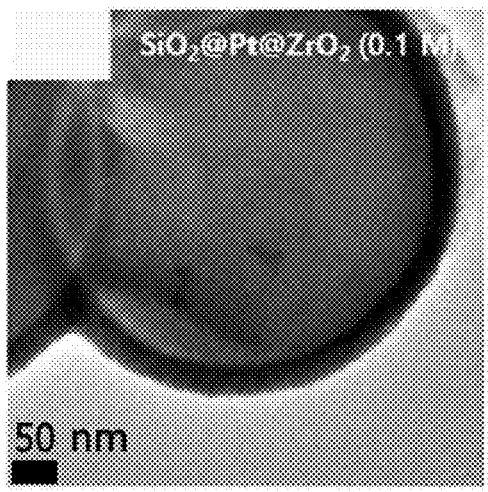
Figure 2C:
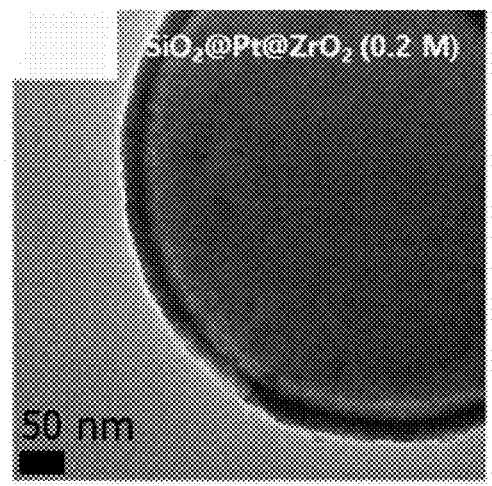
Figure 2D:
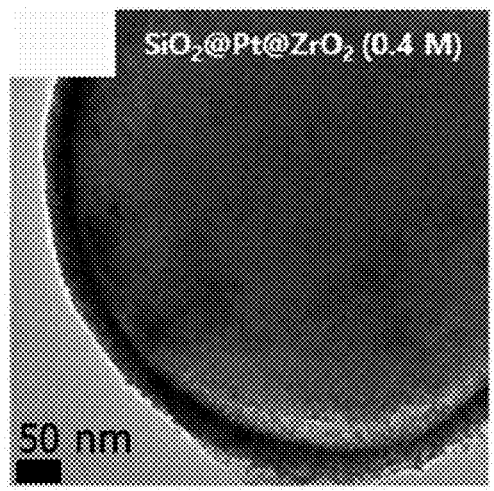
Figure 2E:
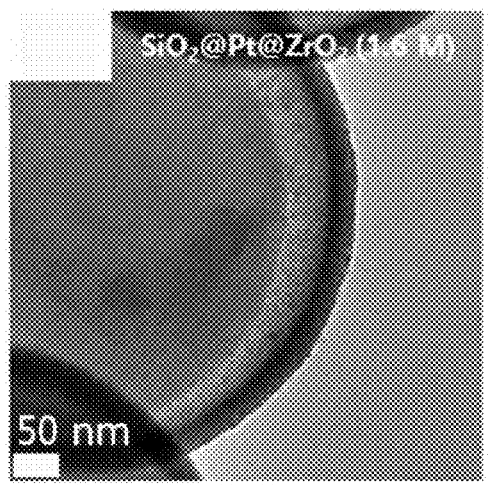
Figure 2F:
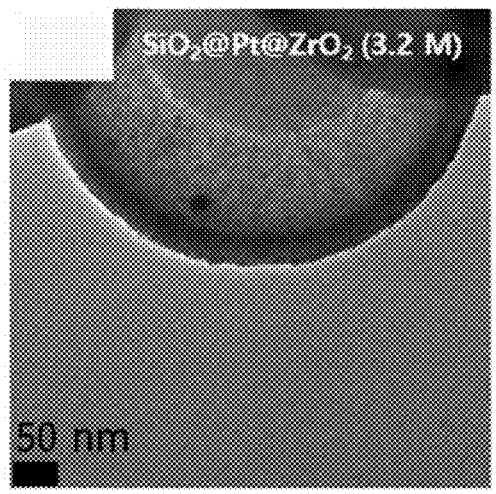

In FIG. 2A, $SiO_2$@Pt@$ZrO_2$ (0 M) denotes the core-shell catalyst prepared in Comparative Example 1, in FIG. 2B, $SiO_2$@Pt@$ZrO_2$ (0.1 M) denotes the core-shell catalyst prepared in Example 1, in FIG. 2C, $SiO_2$@Pt@$ZrO_2$ (0.2 M) denotes the core-shell catalyst prepared in Example 2, in FIG. 2D, $SiO_2$@Pt@$ZrO_2$ (0.4 M) denotes the core-shell catalyst prepared in Example 3, in FIG. 2E, $SiO_2$@Pt@$ZrO_2$ (1.6 M) denotes the core-shell catalyst prepared in Example 4, and in FIG. 2F, $SiO_2$@Pt@$ZrO_2$ (3.2 M) denotes the core-shell catalyst prepared in Example 5.

Referring to FIG. 2, as the etching was performed with KOH at a higher concentration, a core part corresponding to $SiO_2$ was etched inward from the outside. The etching facilitated diffusion of reaction gas.

Experimental Example 2: TEM Image of $SiO_2$@Pt@$ZrO_2$ Catalyst According to Etching Conditions after Hydrothermal Aging The $SiO_2$@Pt@$ZrO_2$ catalysts according to Examples 1 to 5 and Comparative Example 1 were hydrothermally aged and then, examined with a transmission electron microscope (TEM), and the results are shown in FIG. 3.

The hydrothermal aging may be performed for 25 hours, while air containing 10% of water at 100 ml/min was made to flow into the catalyst layers heated at 750° C.

Figure 3A:
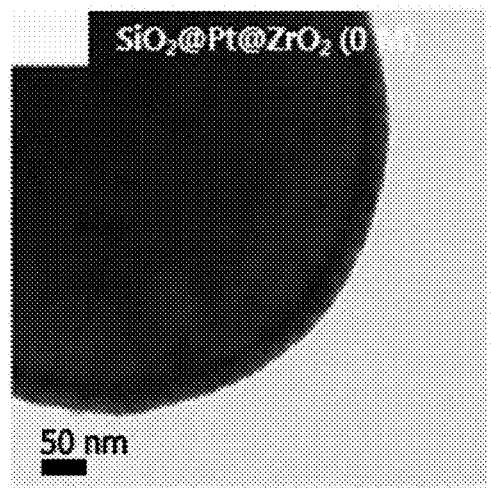
FIGS. 3A, 3B, 3C, 3D, 3E, and 3F are photographs showing the result of observing the catalyst with a transmission electron microscope (TEM) in Experimental Example 2.
Figure 3B:
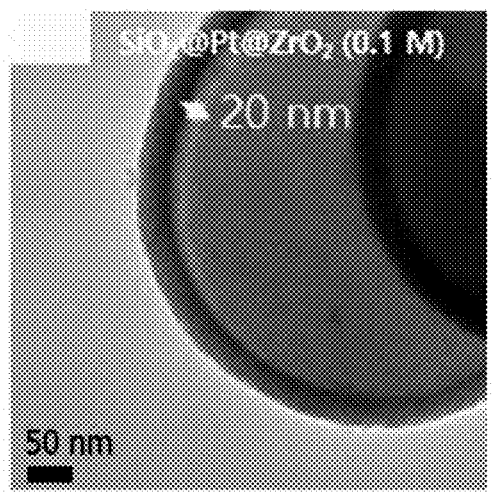
Figure 3C:
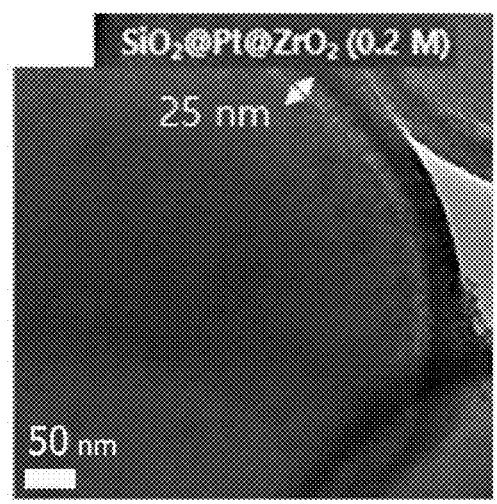
Figure 3D:
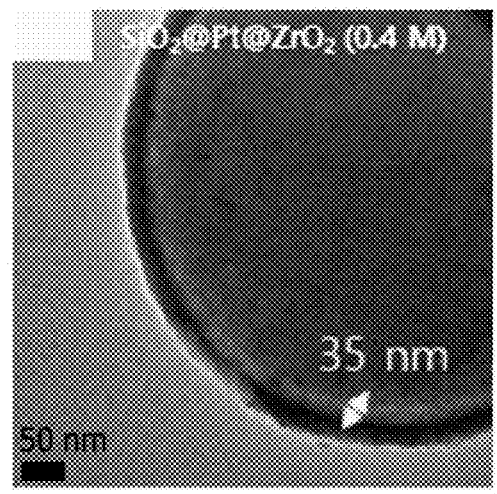
Figure 3E:
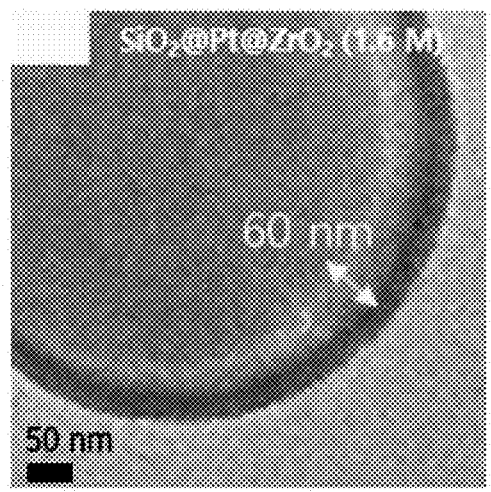
Figure 3F:
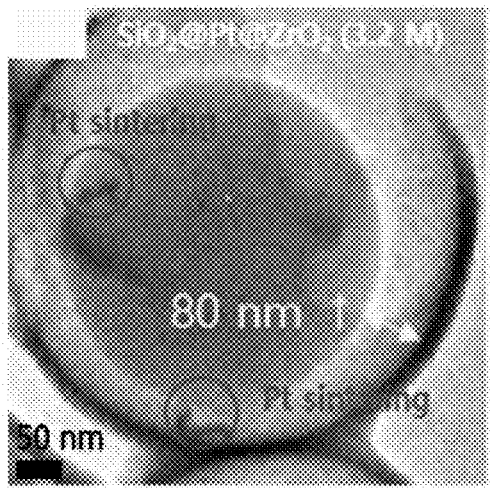

In FIG. 3A, $SiO_2$@Pt@$ZrO_2$ (0 M) denotes the core-shell catalyst prepared in Comparative Example 1, in FIG. 3B, $SiO_2$@Pt@$ZrO_2$ (0.1 M) denotes the core-shell catalyst prepared in Example 1, in FIG. 3C, $SiO_2$@Pt@$ZrO_2$ (0.2 M) denotes the core-shell catalyst prepared in Example 2, in FIG. 3D, $SiO_2$@Pt@$ZrO_2$ (0.4 M) denotes the core-shell catalyst prepared in Example 3, in FIG. 3E, $SiO_2$@Pt@$ZrO_2$ (1.6 M) denotes the core-shell catalyst prepared in Example 4, and in FIG. 3F, $SiO_2$@Pt@$ZrO_2$ (3.2 M) denotes the core-shell catalyst prepared in Example 5.

Referring to FIG. 3, when the etching was performed by using 0.1 M KOH, about 20 nm of $SiO_2$ was etched, when 0.2 M KOH was used, 25 nm was etched, when 0.4 M KOH was used, 35 nm was etched, when 1.6 M KOH was used, 60 nm was etched, and when 3.2 M KOH was used, 80 nm was etched.

In other words, when 20 nm to 60 nm of $SiO_2$ was etched, even after the hydrothermal treatment, sintering of noble metals was suppressed, and the core-shell structures did not collapse. However, when 80 nm or more was etched, a zirconia shell collapsed, and Pt was sintered.

Experimental Example 2: CO and HC Oxidation Performance Measurement

Figure 4:
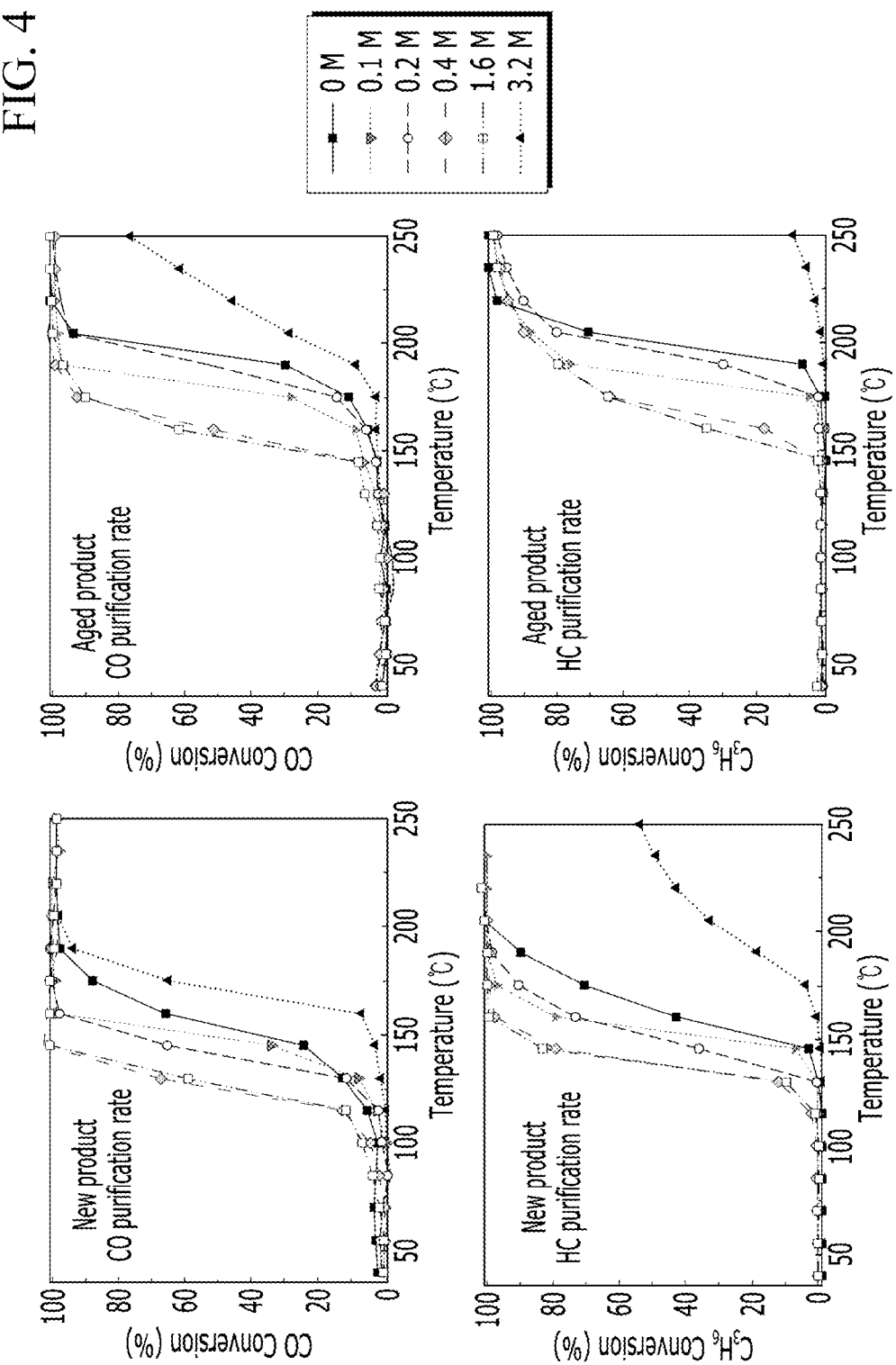
FIG. 4 are graphs showing the result of observing the catalyst with a transmission electron microscope (TEM) in Experimental Example 3.

CO and HC oxidation performances of the $SiO_2$@Pt@$ZrO_2$ catalysts according to Examples 1 to 5 and Comparative Example 1 before/after the hydrothermal aging were measured, and the results are shown in FIG. 4.

The conditions for evaluating the performance of the catalysts are as follows.

Amount of used catalyst: 50 mg

Reaction gas: 0.1% CO, 0.03% $C_3H_6$, 10% $O_2$, 5% $H_2O$, He balance

Flow rate: 100 mL/min

Temperature-raising condition: From 40° C. to 250° C., the temperature is raised at 5° C./min Analyzer: IR In FIG. 4, a new product denotes a catalyst before the hydrothermal aging, and an aged product denotes a catalyst after the hydrothermal aging. In addition, 0 M denotes the core-shell catalyst according to Comparative Example 1, 0.1 M denotes the core-shell catalyst according to Example 1, 0.2 M denotes the core-shell catalyst according to Example 2, 0.4 M denotes the core-shell catalyst according to Example 3, 1.6 M denotes the core-shell catalyst according to Example 4, and 3.2 M denotes the core-shell catalyst according to Example 5.

Referring to FIG. 4, a $SiO_2$@Pt@$ZrO_2$ catalyst prepared by etching about 20 nm to 60 nm of $SiO_2$ had easy accessibility to CO and HC and thus exhibited excellent low temperature oxidation performance, compared with a catalyst having no etching.

However, as for a $SiO_2$@Pt@$ZrO_2$ catalyst prepared by excessively etching 80 nm or more, the core-shell structure collapsed, and activity was reduced by sintering of noble metals.

CO and HC purification performance (KOH concentration, based on $T_{50}$): 1.6 M>0.4 M>0.1 M>0.2 M>0M>3.2 M.

While this disclosure has been described in connection with what is presently considered to be practical example embodiments, it is to be understood that the disclosure is not limited to the disclosed embodiments, but, on the contrary, is intended to cover various modifications and equivalent arrangements included within the spirit and scope greater than or equal to appended claims.

The invention claimed is:

1. A method for preparing a catalyst for reducing CO and HC, comprising:
    fixing noble metal nanoparticles to the metal oxide nanoparticles to form a core;
    forming a shell by coating the core with zirconia ($ZrO_2$); and
    etching the metal oxide of the prepared core-shell particles.

2. The method of claim 1, wherein the forming of the core comprises:
    functionalizing the surface of the metal oxide nanoparticles with an amine group; and
    fixing the noble metal nanoparticles to the metal oxide nanoparticles functionalized with the amine group.

3. The method of claim 1, wherein the forming of the shell comprises:
    dispersing the core in a solvent to prepare dispersion;
    adding a zirconia precursor to the dispersion followed by mixing and drying; and
    firing the resultant at about 300° C. to about 800° C. for about 1 hour to about 24 hours.

4. The method of claim 1, wherein the etching of the metal oxide comprises:
    dispersing the core-shell particles in a solvent to prepare dispersion; and
    adding KOH or HF to the dispersion.

5. The method of claim 4, wherein a concentration of the KOH or HF is about 0.1 M to about 10.0 M.

6. The method of claim 1, wherein the etching of the metal oxide comprises removing the metal oxide nanoparticles from the surface of the metal oxide nanoparticles to a predetermined depth to form a layer from which the metal oxide is removed between the core and the shell.

7. A catalyst for reducing CO and HC being a core-shell particle comprising a core and a shell surrounding the core;
    wherein the core comprises metal oxide nanoparticles and noble metal nanoparticles fixed to the metal oxide nanoparticles;
    the shell comprises zirconia ($ZrO_2$); and
    a layer from which the metal oxide is removed between the core and the shell is included.

8. The catalyst of claim 7, wherein the noble metal nanoparticles comprise Pd, Pt, Ru, Au, or an alloy thereof.

9. The catalyst of claim 7, wherein the noble metal nanoparticles are included in an amount of about 0.1 wt % to about 3 wt % based on a total weight of the catalyst.

10. The catalyst of claim 7, wherein the noble metal nanoparticles have a size of about 1 nm to about 30 nm.

11. The catalyst of claim 7, wherein the metal oxide nanoparticles comprise $SiO_2$, $TiO_2$, $Al_2O_3$, or a mixture thereof.

12. The catalyst of claim 7, wherein the shell has a thickness of about 5 nm to about 50 nm.

13. The catalyst of claim 7, wherein the layer from which the metal oxide is removed has a thickness of about 10 nm to about 70 nm.

14. The catalyst of claim 7, wherein the HC comprises $CH_4$, $C_2H_6$, $C_3H_6$, $C_3H_8$, or a mixture thereof.

* * * * *